Jan. 23, 1968  LE ROY T. DOWNING  3,364,611
FISHING LURE RETRIEVER
Filed April 5, 1965
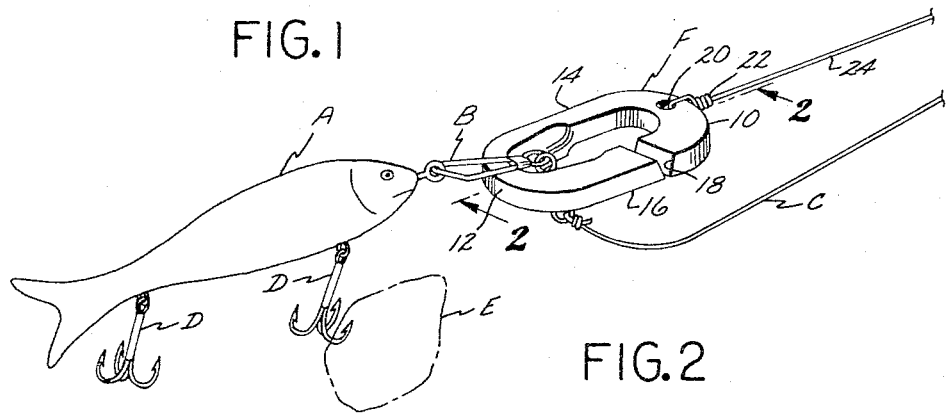
FIG. 1
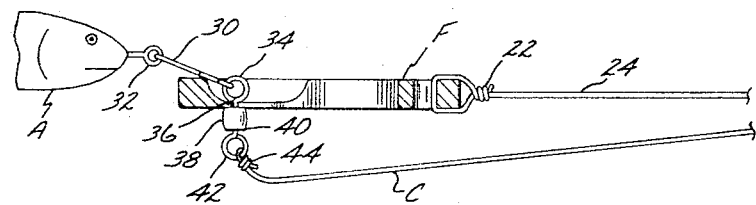
FIG. 2
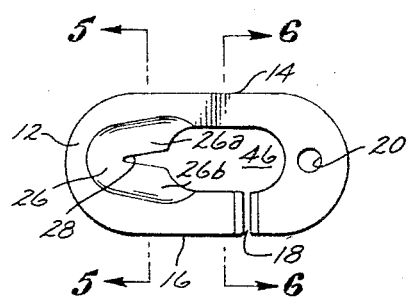
FIG. 3
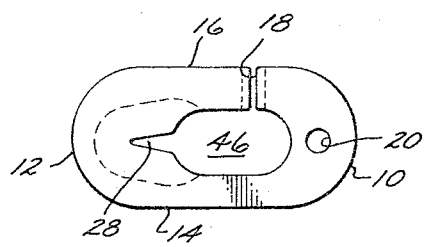
FIG. 4
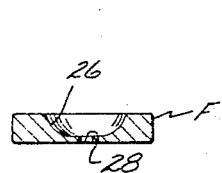
FIG. 5
FIG. 6
INVENTOR.
LEROY T. DOWNING
BY
William C. Babcock
ATTORNEY ём
United States Patent Office 3,364,611
Patented Jan. 23, 1968

3,364,611
FISHING LURE RETRIEVER
Le Roy T. Downing, 12615 E. Lemming St.,
Lakewood, Calif. 90713
Filed Apr. 5, 1965, Ser. No. 445,666
1 Claim. (Cl. 43—17.2)

ABSTRACT OF THE DISCLOSURE

A compact, lightweight flat body having a central opening adapted to be attached to a fishing line to slide downwardly thereon due to force of gravity to a position where a recessed tapered notch in said body engages a swivel attached to a lure. When the body is so attached to a swivel and when a cord attached to the body is pulled, the body may be used to dislodge a lure attached to the swivel out of a snagged position.

A major object of the present invention is to provide a lure retrieving device that is compact and light in weight, easily carried in a pocket, is simple and easy to use, requires no elaborate plant facilities for the manufacture thereof, and can be retailed at a sufficiently low price as to encourage its widespread use.

These and other objects and advantages of the invention will become apparent from the following description of a preferred form thereof, and from the accompanying drawing illustrating the same, in which:

FIGURE 1 is a perspective view of the lure retriever in engagement with the swivel portion of a lure which has become snagged on a submerged body;

FIGURE 2 is a longitudinal cross-sectional view of the retriever, taken on the line 2—2 of FIGURE 1;

FIGURE 3 is a top plan view of the device;

FIGURE 4 is a bottom plan view of the retriever;

FIGURE 5 is a transverse cross-sectional view of the device, taken on the line 5—5 of FIGURE 3; and FIGURE 6 is a transverse cross-sectional view of the retriever, taken on the line 6—6 of FIGURE 3.

With continuing reference to the drawing for the general arrangement of the invention, a conventional lure A is shown in FIGURE 1 that is connected on the forward portion thereof to a swivel B, which in turn is affixed to a line C. The lure A is held in a fixed position under water, due to the fact that one of the hooks D thereon has become snagged on a submerged object E. The line C is of a type that does not have sufficient tensile strength to permit exertion of enough strain thereon to dislodge the lure from the object E.

The lure retriever F, as best seen in FIGURES 1 and 2, is defined by an elongate rigid body, preferably of metal, that includes a first curved end 10, a second curved end 12, a first side piece 14, that connects the ends 10 and 12, and a second side piece 16 which is laterally spaced from the first side piece 14 that is also connected to the ends 10 and 12. A transverse slot 18 extends transversely through side piece 16 and this slot 18 is sufficiently wide to permit the line C to pass therethrough. A bore 20 extends through end 10 which is engaged by a knotted end portion 22 of a cord 24 of substantially greater strength than the line C.

The uper rear parts of the side pieces 14 and 16 and the upper portion of the second curved end 12 are provided with a recessed portion 26. The width of the second curved end 12, as can best be seen in FIGURE 3, is substantially greater than that of the first curved end 10. A rearwardly and inwardly extending tapered opening 28 is formed in the recessed portion 26 in end 12.

The swivel B is of conventional design and includes a link 30 that is removably affixed to a suitable fastener 32 provided on the forward end of the lure A. Link 30 is also removably affixed to a first eye 34 which has a shank 36 that pivots in a collar 38. The collar 38 also has a second shank 40 pivotally mounted therein, which supports a second eye 42 that by a knotted portion 44 is connected to the line C.

The length of the shank 36 between the eye 34 and collar 38 is sufficiently long to permit recessed portions 26a and 26b of the retriever F on each side of the opening 28 to slidably engage the shank (FIGURE 2), and when a strain is exerted on the cord 24, the retriever F will remain in removable engagement with swivel B to permit sufficient force to be exerted on the lure A that the hook D will separate from the submerged object E.

The use and operation of the invention is relatively simple. When the lure A becomes snagged on an underwater object E, such as shown in FIGURE 1, the line C is pulled taut. The retriever F is then slidably mounted on the line C by passing the line through the slot 18, to place the retriever on the line, which line serves as a guide for the retriever which is allowed to move downwardly thereon by force of gravity. The material from which the retriever F is fabricated must be sufficiently dense as to gravitate downwardly on the line C after the retriever is below the surface of the water.

The open center 46 of the retriever F is smaller in cross section than the maximum transverse cross section of the lure A, so that the lure will not pass completely therethrough. However, the open center 46 is sufficiently large in cross section as to permit the swivel B to pass through the same.

After the retriever F has passed downwardly on the line C to a position where the swivel B has passed substantially through the open center 46, a slow upward pull is exerted on the cord 24. As cord 24 is drawn upwardly, the retriever F moves upwardly relative to swivel B, and in so doing the shank 36 enters opening 28. The shank 36 moves rearwardly in opening 28, with the under surfaces of the recessed portions 26a and 26b then abutting against the collar 40 in the manner shown in FIGURE 2. After such engagement, a strong upward pull can be exerted on cord 24 to separate lure A from body E on which it is fouled, with the force of the pull being exerted first on collar 40 and then through shank 36, eye 34, and link 30 to the lure.

In the event a fish (not shown) has taken one of the hooks D prior to the lure A becoming snagged on body E, the fish will also be retrieved with the lure. During the retrieving operation no strain is exerted on the line C, whereby the possibility that the line might snap during the retrieving operation is completely eliminated.

The retriever F is preferably molded as an integral unit from a lightweight metal such as aluminum or an alloy thereof, and is of such size that it can be conveniently carried in a jacket pocket. The recess 26 serves as a guide to direct the shank 36 into the opening 28 when the retriever F is moved upwardly relative to the swivel B.

From the previous description of the operation of the invention, it will be apparent that the lure retriever F can be formed from any rigid material having a density greater than that of water, so that it will slide downwardly on the line C by force of gravity when placed thereon. The material used in forming the retriever should preferably be one that is not adversely affected by exposure to water or moisture.

Although the retriever has been described as being primarily adapted for use in bringing a snagged lure to the surface, it should also be borne in mind that it may be used to retrieve a lure that has been taken by a fish prior to being snagged. The retriever F will operate in the manner described, if the swivel B is replaced by a conventional weight (not shown).

Although the present invention is fully capable of achieving the objects and providing the advantages hereinbefore mentioned, it is to be understood that it is merely illustrative of the presently preferred embodiment thereof and I do not mean to be limited to the details of construction herein shown and described, other than as defined in the appended claim.

I claim:
1. A device for retrieving a lure from a fouled underwater position, which lure is connected to a line by a swivel that includes an eye, a link connected to said eye and lure, a shank affixed to said eye, and a collar that pivotally supports said shank, said device comprising:
   (a) an elongate flat, planar body of non-buoyant rigid material that is of substantially uniform thickness and includes first and second curved ends provided with first and second laterally spaced side pieces extending therebetween which cooperate therewith in defining a single, elongate central opening in said body, said second side piece having a transverse slot formed therethrough that is in communication with said opening, said first curved end having a bore formed therethrough in substantially the center thereof, a recess formed in the upper parts of said first and second side pieces and joined by a recess in said second curved end, and a rearwardly and inwardly tapered opening formed in the recessed portion of said second curved end; and
   (b) a cord of greater strength than that of said line, which cord extends through said bore and is knotted to remain in engagement with said body, with said line when pulled taut serving as a guide to permit said body to gravitate downwardly thereon said recess guiding said shank of said swivel into said tapered opening when said body is moved upwardly relative to said swivel by said cord.

References Cited
UNITED STATES PATENTS

| | | | |
|---|---|---|---|
| 2,714,777 | 8/1955 | Peak | 43—17.2 |
| 2,828,570 | 4/1958 | Bradbury | 43—17.2 |
| 2,926,449 | 3/1960 | Rupert | 43—17.2 |
| 2,948,077 | 8/1960 | Karpes | 43—17.2 |
| 3,039,223 | 6/1962 | Pavek | 43—17.2 |

FOREIGN PATENTS 657,037  2/1963  Canada.

SAMUEL KOREN, *Primary Examiner.*
WARNER H. CAMP, *Examiner.*